Patented Jan. 24, 1939

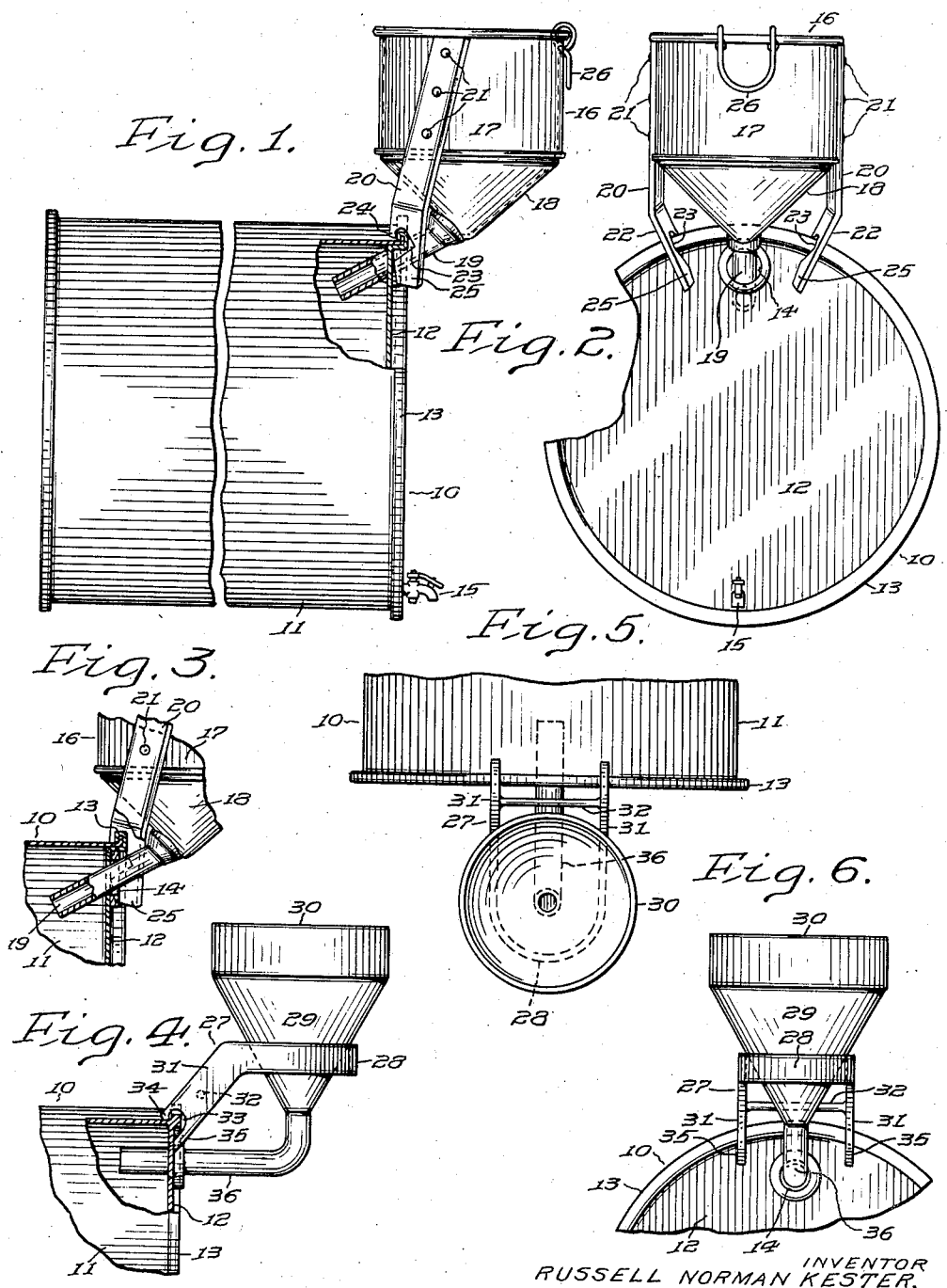

2,144,923

UNITED STATES PATENT OFFICE 2,144,923

FUNNEL SUPPORT

Russell Norman Kester and Elmir Otis Baldwin, Jr., Adrian, Mich., assignors to George D. Ellis and Sons, Incorporated, a corporation of Pennsylvania Application April 3, 1937, Serial No. 134,714

8 Claims. (Cl. 226—31)

The invention relates to funnel supports and involves an improvement in devices for filling a metal barrel, drum or the like through the usual filling opening in the head thereof when the barrel is arranged in a horizontal position.

Various forms of apparatus have been devised heretofore for this general purpose. Some of the prior devices have been so constructed that it was necessary to support them on the curved wall of the barrel when they were in use. Devices of that kind are objectionable for the reason that they cannot be used in the manner intended when the barrel is so located that the curved wall thereof is inaccessible as a support for the filling device.

Other barrel filling devices of this general character, as heretofore made, have been so constructed that the weight of the device is borne by the funnel spout and a bracing member arranged to engage with the outer surface of the barrel head. Filling devices of that particular type have been objectionable by reason of the fact that the spout structure of the funnel must be substantially made in order to support the funnel and its contents as well as any other pressure that may be accidentally applied thereto. Such a type of filling device has also been objectionable for the reason that its structure permitted it to tip when in use in filling a barrel, with the result that the contents of the funnel are frequently spilled.

One of the principal objects of the present invention is the provision of a filling device for a container of the barrel or drum type which is fully supported by the barrel, notwithstanding the fact that the container may be so located that the curved wall thereof is inaccessible. Another object of the invention is the provision of a barrel filling device which is not easily tipped so as to permit the contents of the filling funnel to be spilled. Another object of the invention is the provision of a barrel filling device which is so constructed as to avoid any weight on the funnel spout when the device is in use. Another important object of the invention is the provision of a filling device which is so constructed that it may be utilized with any standard metal barrel or drum having a bead on the chime portion thereof. A still further object of the invention is the provision of a barrel filling device which may be cheaply manufactured, yet is of rigid structure and is sufficiently strong to support any weight to which it may be subjected when in use.

Still further objects and advantages of the invention will be apparent with the following description taken with the accompanying drawing, wherein:

Fig. 1 is a side elevational view, partly in section, showing one form of the improved filling device in position for filling a barrel or drum;

Fig. 2 is an end elevational view of the device shown in Fig. 1;

Fig. 3 is a detailed, sectional view of a part of the device as shown in Fig. 1;

Fig. 4 is a side elevational view of a modified form of filling device in position for use in filling a barrel;

Fig. 5 is a plan view of the filling device shown in Fig. 4; and

Fig. 6 is an end elevational view of the filling device shown in Fig. 4.

The two forms in which the invention is embodied are shown in the drawing in position for use in filling a metal barrel or drum 10 positioned on its side and having the usual curved side wall 11 and head 12. As such barrels are ordinarily made, the heads are inwardly dished and the outer edges thereof are secured to the edges of the curved side wall in such a manner as to provide an outwardly projecting bead 13 at the chime portion of the barrel. This bead is utilized for supporting the different forms of the invention disclosed herein. The heads of such barrels are also provided with a filling opening 14 which may be threaded to receive a plug, and with a faucet 15 from which the contents may be withdrawn.

In the form of the invention shown in Figs. 1, 2 and 3 of the drawing, a funnel 16 is utilized which has a cylindrical side wall 17, and a tapered bottom wall 18. This funnel is provided with a spout 19 which extends outwardly from the lower end of the tapered bottom with its outlet end terminating at a substantial distance outside the line of the side wall 17.

A pair of bracket arms 20 is secured to the wall 17 in any suitable manner, such as by rivets 21. The bracket arms 20 are positioned on opposite sides of the funnel, and are preferably arranged at an angle thereon, as shown in Fig. 1, so that their lower ends are positioned on opposite sides of the spout 19. In order that the bracket arms 20 may more readily conform to the curvature of the barrel head 12, the lower ends thereof may be bent inwardly toward each other to provide the converging portions 22, the extreme ends of which preferably extend downwardly below the spout 19.

The edge of each of the converging portions 22 opposite the lower end of the tapered portion of the funnel has a cut-out 23 formed therein to provide an overhanging hook 24 for engagement behind the chime bead 13. This cutout portion also provides an abutment 25 below the hook 24 for engagement with the outer face of the barrel head 12.

As will be readily apparent from Figs. 1, 2 and 3 of the drawing, the device shown therein is entirely supported on the barrel by the engagement of the hook portions 24 over the bead 13 and by contact of the abutment portions 25 with the barrel head 12, and the spout 19 extends freely through the filling opening 14 without supporting any of the weight of the funnel and its contents. It will also be apparent that the center of gravity of the device is such that the weight of the funnel serves to maintain the entire device in proper position for filling the barrel, and that there is no likelihood of the apparatus being tipped over in any direction to spill its contents. Any suitable form of handle, such as a bail 26, may be secured to the funnel in order that it may be readily carried.

In the form of the device shown in Figs. 4, 5 and 6, the funnel support 27 is shown as being made from a strip of sheet metal bent intermediate its ends to provide a loop portion 28 upon which the tapered bottom 29 of a funnel 30 may be supported when the device is in use for filling the barrel 10. The outer ends 31 of the metal strip are bent downwardly at an angle with respect to the loop portion 28, and the bent ends 31 may be held in spaced relation with respect to each other by means of a tie rod 32. The extreme end of each of the downwardly bent portions 31 is provided with a cut-away portion 33 which forms an overhanging hook 34 for engagement behind the chime bead 13. The cutaway portion 33 also provides an abutment 35 below the hook for engagement with the outer surface of the barrel head 12.

With this form of device, the support proper is not secured to the funnel 30 as in the case of the form previously described. Any standard type of funnel having a tapered bottom wall 29 may be utilized therewith, the tapered portion of the funnel being supported in the loop 28 so that the angularly bent spout 36 extends inwardly through the usual filling opening 14 in the barrel head.

The form of device shown in Figs. 4, 5 and 6 of the drawing is similar to the form shown in Figs. 1, 2 and 3 in that the weight of the supporting device itself, together with the funnel and its contents during the barrel filling operation, is carried entirely by the bead engaging hook and the head engaging abutment. The hook portions and the abutment portions being rigidly formed on the bracket arms, the entire device is secured against downward movement with respect to the drum, even when the funnel is full of liquid. This insures that the weight of the device and the contents of the funnel are not supported upon the spout, and that the spout is maintained in proper position with respect to the filling opening of the drum. It will be apparent, therefore, that the funnel spout extends freely through the filling opening 14 and that it is not necessary to make the spout as rigid and of such substantial material as would be required if any of the weight of the parts were carried by the spout. In fact, with a supporting device of the type herein disclosed, the spout may be made of flexible material, such as a piece of hose, if desired.

While specific forms and arrangements of the various parts of the improvement are disclosed herein, it is to be understood that the disclosure is illustrative only and that changes in form and arrangement of the elements may be made within the scope of the invention as it is described herein and pointed out in the appended claims.

What we desire to claim as our invention is:

1. A device for filling a barrel positioned on its side and having a chime bead thereon and a filling opening in the head thereof, comprising a pair of spaced bracket arms, means for supporting a funnel on the upper ends of said arms, a hook member rigidly formed on each of said arms near the lower end thereof for engagement on opposite sides of said filling opening behind said chime bead, and an abutment portion formed on the lower end of each of said arms below said hook member for engagement with the head of the barrel.

2. A device for use in filling a barrel positioned on its side and having a chime bead thereon and a filling opening in its head, comprising a pair of spaced bracket arms, means for supporting a funnel on the upper ends of said arms and securing said arms in fixed relation with respect to each other, each of said arms having a cut-out portion near its lower end to provide an overhanging hook for engagement behind said chime bead on the opposite sides of said filling opening, and an abutment on the lower end of each of said arms below said hook for engagement with the head of the barrel.

3. In a filling device for use in filling a barrel positioned on its side and having a chime bead thereon and a filling opening in its head, a pair of spaced bracket arms, means for supporting a funnel on the upper ends of said arms and securing said arms in fixed relation with respect to each other, each of said arms having a cutout portion near its lower end to provide an overhanging hook for engagement behind said chime bead on the opposite sides of said filling opening and to provide an abutment below said hook for engagement with the head of the barrel.

4. A filling device for use in filling a barrel positioned on its side and having a chime bead thereon and a filling opening in its head, comprising a funnel with a spout thereon, a pair of bracket arms secured to the opposite sides of said funnel and extending downwardly therefrom on opposite side of said spout, a hook member rigidly secured on each of said arms near the lower end thereof for engagement behind said chime bead on the opposite sides of said filling opening, and an abutment on the lower end of each of said arms below said hook member for engagement with the head of the barrel.

5. A barrel filling device comprising a funnel having a spout extending laterally from the bottom thereof, a pair of bracket arms secured to the opposite sides of said funnel and extending downwardly on opposite sides of said spout, a hook formed on each of said arms for engagement behind the chime bead of a barrel, and an abutment on the lower end of each of said arms for engagement with the head of the barrel.

6. In a filling device for use in filling a barrel positioned on its side and having a chime bead thereon and a filling opening in its head, a pair of spaced bracket arms, a funnel holder secured to the upper ends of said arms and extending laterally from one side thereof, and means on the lower ends of said arms for removably attaching the device to the barrel, said means comprising a hook portion formed on the side of each of said arms opposite said holder for engagement behind the chime bead of the barrel on opposite sides of said filling opening and an abutment below said hook portion for engagement with the head of the barrel.

7. A funnel support comprising a holder for engagement with the tapered portion of the funnel, a pair of spaced bracket arms secured to said holder and extending downwardly at an angle therefrom, a hook member formed near the lower end of each of said arms on the side opposite said holder for engagement on opposite sides of a filling opening in a barrel head behind the chime bead of the barrel when positioned on its side, and an abutment on the lower end of each of said arms below said hook member for engagement with the head of the barrel.

8. A funnel holder comprising an integral strip of metal bent intermediate its ends to form a loop for engagement with the tapered portion of the funnel to support the same, the end portions of said strip being bent angularly from said loop substantially in the same direction to form a pair of spaced bracket arms, the end of each of said arms having a portion thereof cut away to provide an overhanging hook for engagement on opposite sides of a filling opening in a barrel head behind the chime bead of the barrel when positioned on its side and to provide an abutment for engagement with the head of the barrel.

RUSSELL NORMAN KESTER.
ELMIR OTIS BALDWIN, Jr.